(12) United States Patent
Carpenter et al.

(10) Patent No.: US 7,689,733 B2
(45) Date of Patent: Mar. 30, 2010

(54) METHOD AND APPARATUS FOR POLICY-BASED DIRECT MEMORY ACCESS CONTROL

(75) Inventors: Todd L. Carpenter, Monroe, WA (US); William J. Westerinen, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/684,307

(22) Filed: Mar. 9, 2007

(65) Prior Publication Data
US 2008/0222663 A1 Sep. 11, 2008

(51) Int. Cl.
G06F 13/28 (2006.01)
G06F 15/167 (2006.01)

(52) U.S. Cl. ............... 710/22; 710/23; 710/24; 710/28; 709/212

(58) Field of Classification Search ............. 710/22–24, 710/28; 709/212
See application file for complete search history.

(56) References Cited

U.S. PATENT DOCUMENTS

| | | | |
|---|---|---|---|
| 5,561,820 A | 10/1996 | Bland et al. | |
| 5,935,223 A | 8/1999 | Griffith et al. | |
| 6,769,052 B2 | 7/2004 | Chauvel et al. | |
| 6,785,776 B2 | 8/2004 | Arimilli et al. | |
| 6,934,758 B2 | 8/2005 | Scheifler et al. | |
| 7,051,123 B1 | 5/2006 | Baker et al. | |
| 2002/0169979 A1 | 11/2002 | Zimmer | |
| 2004/0153672 A1 | 8/2004 | Watt et al. | |
| 2004/0230457 A1* | 11/2004 | Rosenbloom et al. | 705/2 |
| 2004/0236876 A1* | 11/2004 | Kondratiev et al. | 710/22 |
| 2005/0060508 A1 | 3/2005 | Rischar et al. | |
| 2005/0108534 A1* | 5/2005 | Bajikar et al. | 713/172 |
| 2005/0114639 A1 | 5/2005 | Zimmer | |
| 2006/0075057 A1 | 4/2006 | Gildea et al. | |
| 2006/0075285 A1 | 4/2006 | Madukkarumukumana et al. | |
| 2006/0085591 A1 | 4/2006 | Kumar et al. | |
| 2006/0242332 A1 | 10/2006 | Johnsen et al. | |
| 2007/0150559 A1 | 6/2007 | Smith | |
| 2007/0174507 A1 | 7/2007 | Conti | |
| 2007/0192826 A1 | 8/2007 | Frank et al. | |

FOREIGN PATENT DOCUMENTS

WO    WO-2004/107176    12/2004

OTHER PUBLICATIONS

"QLogic's Continuous Innovation and Leadership Enables End-to-End Virtualization," http://www.qlogic.com/documents/datasheets/knowledge_data/whitepapers/SN0130913-00A.pdf.

(Continued)

*Primary Examiner*—Niketa I Patel
(74) *Attorney, Agent, or Firm*—Marshall, Gerstein & Borun LLP

(57) ABSTRACT

A computer that operates in a metered mode for normal use and a restricted mode uses an input/output memory management unit (I/O MMU) in conjunction with a security policy to determine which peripheral devices are allowed direct memory access during the restricted mode of operation. During restricted mode operation, non-authorized peripheral devices are removed from virtual address page tables or given vectors to non-functioning memory areas.

15 Claims, 3 Drawing Sheets

OTHER PUBLICATIONS

Boissinot et al., "Distributed System Monitoring and Failure Diagnosis using Cooperative Virtual Backdoors," Jun. 16, 2006, http://perso.ens-lyon.fr/benoit.boissinot/report/bboissin_report_m2.pdf.
"Logical Partition Security in the IBM eServer pSeries 690," http://www-03.ibm.com/servers/eserver/pseries/hardware/whitepapers/lpar_security.html.

International Search Report for PCT/US2008/056402 mailed Jul. 4, 2008.

Written Opinion for PCT/US2008/056402 mailed Jul. 4, 2008.

* cited by examiner

METHOD AND APPARATUS FOR POLICY-BASED DIRECT MEMORY ACCESS CONTROL

BACKGROUND

In many cases, it is desirable to restrict the operation of a computer to known modes. For example, a parent may wish to restrict gaming time while allowing word processing. In another example, a company may wish to limit the use of an expensive peripheral, such as a 3-D printer, only to authorized users. In another example, a pay-per-use computer may have an unlimited use mode when the terms of an associated contract are satisfied and a restricted use mode that only allows input of additional usage time or points when terms of the associated contract are not met.

Direct memory addressing (DMA) allows a peripheral device to directly access memory so data updates and interchange may occur while allowing the computers main processor to continue other operations. However, DMA creates another vulnerability when attempting to restrict computer operation to a core set of functions by creating an opportunity for a peripheral device using DMA to alter or replace a security program running in main memory.

However, because DMA is an integral part of the operation of most computers and even fundamental operations may require the use of DMA-oriented peripherals, it may not be possible to simply turn off DMA when restricted use operation is desired.

SUMMARY

Computer architectures that use an input/output memory management unit (I/O MMU) allow pairing of virtual memory addresses to physical locations of memory in a computer environment. When a device requests access to memory, for example, a printer driver or game controller, the I/O MMU refers to an I/O translation lookaside buffer (I/O TLB) with a limited number of page table entries that relate the virtual address requested by the device to a physical address in the computer's memory. If a page table entry does not exist for the requested address, an interrupt may be generated and the I/O MMU may load new page table entries that cover the requested address.

When operating a computer in a restricted mode, page table entries for certain DMA-oriented peripheral devices may be denied access to main memory, while trusted or authenticated devices may be allowed access to main memory. A policy administered by the CPU or a Hypervisor/virtual machine manager (VMM) may be used to determine appropriate access under differing operating conditions to determine which peripheral devices have DMA access to the memory.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
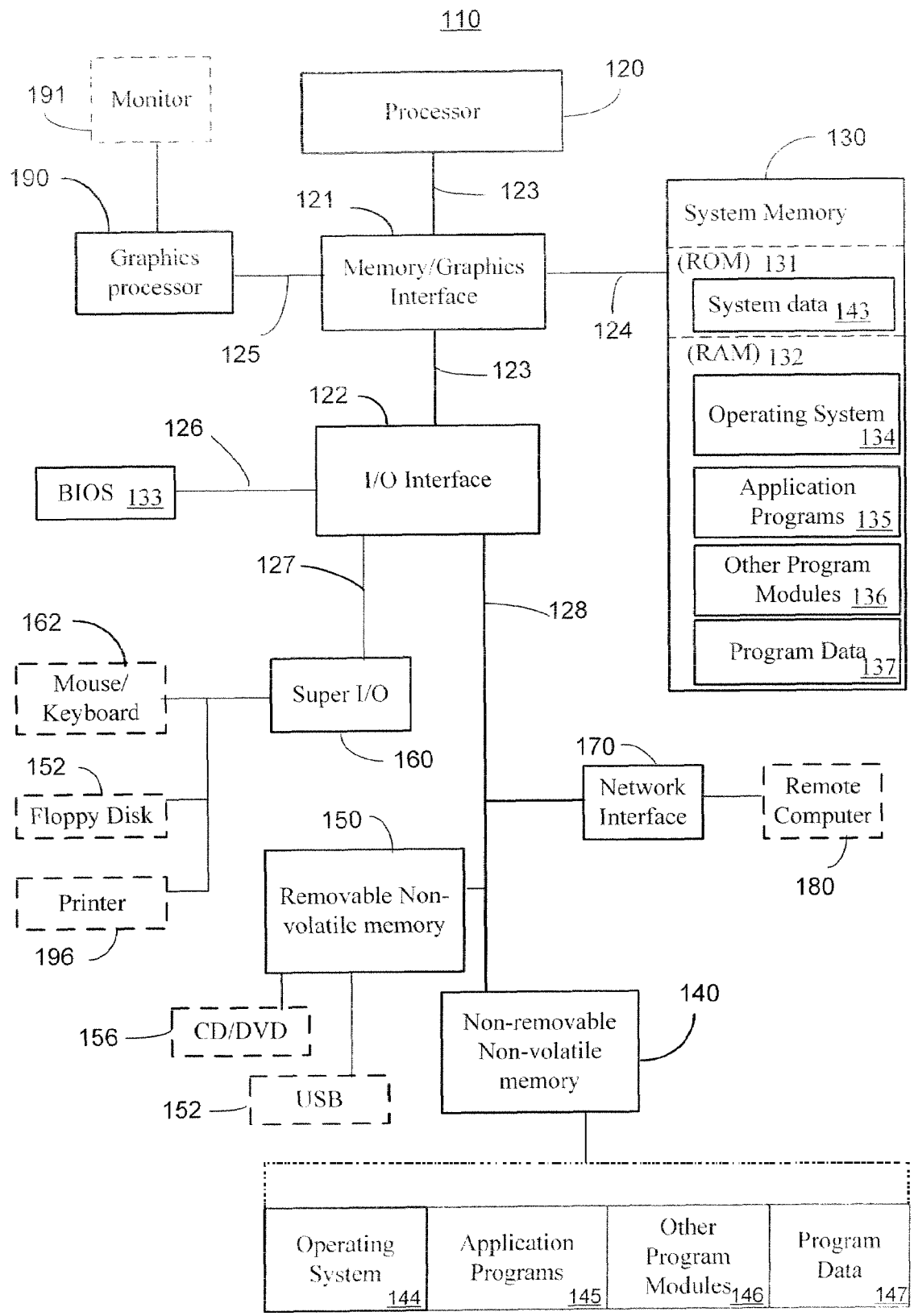
FIG. 1 is a simplified and exemplary block diagram of a computer system suitable for use with policy-based direct memory access control.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 10 may include, but are not limited to, a processor 120, a system memory 130, a memory/graphics interface 121, also known as a Northbridge chip, and an I/O interface 122, also known as a Southbridge chip. A memory 130 and a graphics processor 190 may be coupled to the memory/graphics interface 121. A monitor 191 or other graphic output device may be coupled to the graphics processor 190.

A series of system busses may couple various these system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 121 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

Computer 110 typically includes a variety of computer readable media. Computer readable media can be any available media that can be accessed by computer 110 and includes both volatile and non volatile media, removable and non-removable media. By way of example, and not limitation, computer readable media nay comprise computer storage media and communication media. Computer storage media includes both volatile and nonvolatile, removable anti non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 128 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 2, keyboard/mouse 162, and printer 196, as examples. The super I/O chip 122 my be connected to the I/O interface 121 with a low pin count (LPC) bus, in some embodiments. The super I/O chip is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect—Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 152 or CD/DVD drive 156 may be connected to the PCT bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processing unit 120 through one of the I/O interface busses, such as the SPI 126, the LPC 127 or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection depicted in FIG. 1 may include a local area network (LAN), a wide area network (WAN), or both, but may also include other networks. Such networking environments are commonplace in offices, enterprise-wide computer networks, intranets and the Internet.

In some embodiments, the network interface may use a modem (not depicted) when a broadband connection is not available or is not used. It will be appreciated that the network connection shown is exemplary and other means of establishing a communications link between the computers may be used.

Figure 2:
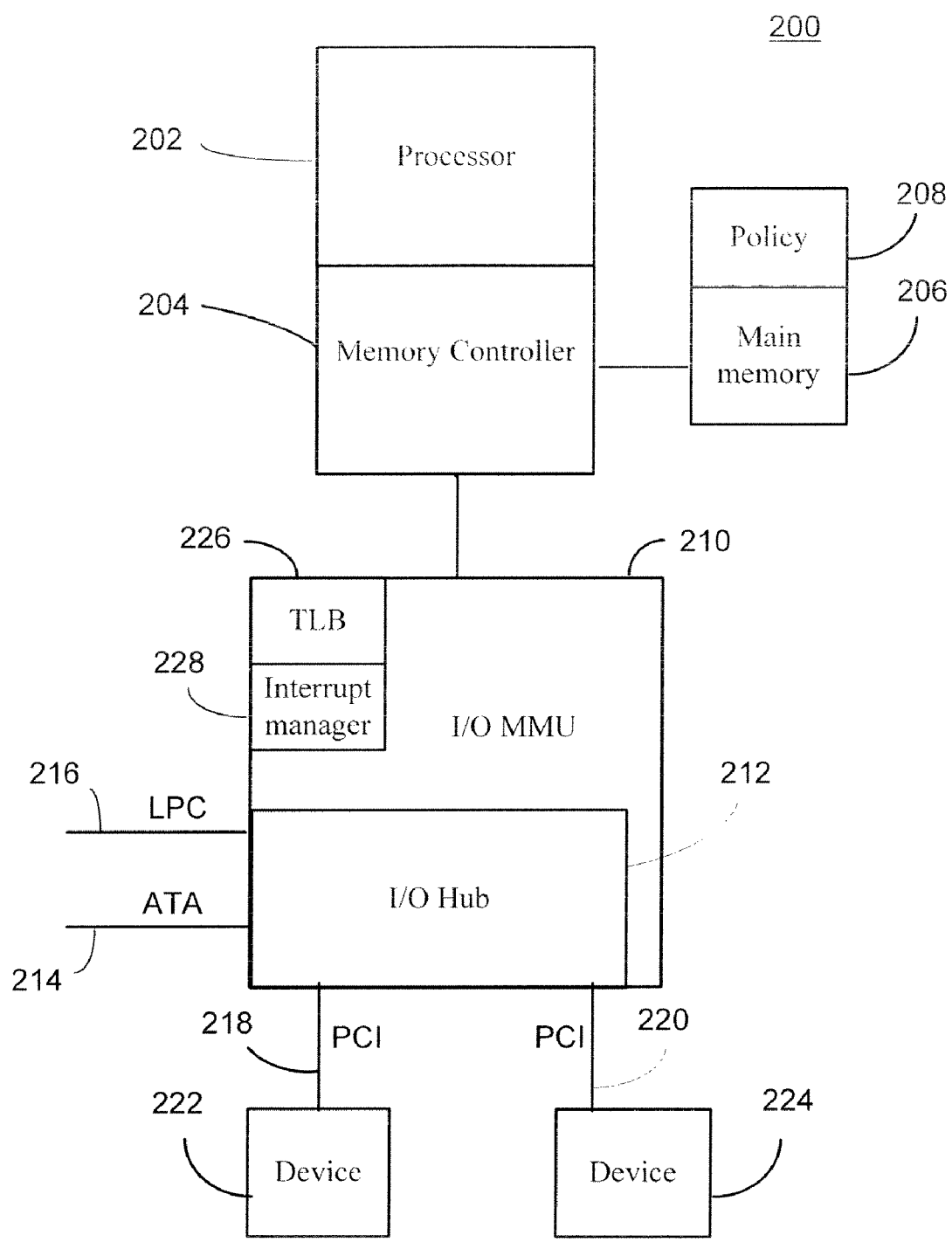
FIG. 2 is a detail of a portion of the computer of FIG. 1.

FIG. 2 is another view of the computer of FIG. 1, showing only a subset of the computer 110 of FIG. 1, for the purposes of illustration. In the embodiment shown in FIG. 2 an I/O memory management unit (MMU) functions as the I/O interface 122 of FIG. 1. An I/O MMU is a device that manages peripheral device access to memory in a manner similar to that used by a processor when accessing system memory. A peripheral device may save processor execution cycles by directly reading and writing to an assigned portion of memory, alleviating the processor from a read/write step with the peripheral and a second write/read step with the memory. An I/O MMU allows a further abstraction so that the peripheral device does not have to know a physical memory location but may be assigned and use a virtual memory address. The I/O MMU then uses an I/O translation lookaside buffer (I/O TLB) or equivalent, to determine what physical address is assigned to that peripheral device. When a miss occurs, that is, when a requested address is not in the I/O TLB, an interrupt may be generated and they full page table space may be examined to determine the appropriate virtual to physical pairing. When the match is found, the address may be added to the I/O) TLB (sometimes at the expense of the oldest unused address) and the lookup retried.

The computer 200 of FIG. 2 has a processor 202 and a memory controller 204. In some embodiments using special processors from AMD, the memory controller 204 may be physically inside the processor 202. In other embodiments, the memory controller 204 may be separate, as shown in FIG. 1. The memory controller 204 may be coupled to a main memory 206, at least some of which is dedicated to computer executable instructions for executing a policy manager 208. The policy manager 208 may be stored, executed, or both, from a secure memory, or may be cryptographically protected, as known in the art.

The memory controller 204 may be coupled to an I/O MMU 210. Within the I/O MMU 210, an I/O hub 212 may support physical connections to a variety of peripherals on a number of connections, including an ATA bus 214, an LPC bus 216, and one or more PCI connections 218, 220. The PCI connections 218 and 220 may couple respective peripheral devices 222, 224. These peripheral devices 222, 224 may include, but are not limited to, network interfaces, fixed or removable memory, or other devices mentioned with respect to FIG. 1. The I/O MMU 210 may include a translation lookaside buffer 226, often a content addressable memory (CAM) that caches virtual-to-physical memory translations. When a requested virtual address does not have an entry in the I/O TLB an interrupt may be generated for the processor 202 or the I/O MMU 210 to intervene and supply the requested address. Of particular interest are peripheral devices that include memory or can forward data into main memory 206.

When a computer is used in a pay-per-use environment, it may operate in two different modes. A first mode may allow full operation, where a user has access to all the features and functions of the computer, including the ability to install and use add-on peripheral devices. The first mode of operation may be allowed when contractual terms related to use are met, for example, a monthly use subscription is paid up. However, should the contractual terms not be met, for example, if the monthly subscription is allowed to lapse, a limited or restricted use mode of operation may be imposed on the computer. Other modes of operation may be contemplated, such as a gaming, mode, office mode, or others that may use specific settings of the I/0 TLB to accomplish or enforce those additional modes of operation.

During the limited function mode of operation, the computer's operation may be restricted to a very limited set of functions, including, but not limited to, slow speed network access, limited graphics capability, and operation of only pre-approved peripheral devices. In one embodiment, game controllers, advanced graphics processors, and polyphonic sound may be restricted or disabled. The first reason for restricting peripherals is to eliminate beneficial use of the computer until the user satisfies contractual terms. A second reason for restricting peripherals is to reduce the threat of a virus-like programmatic attack on the program managing the limited function mode of operation. Because some peripherals can use DMA access to the main memory 206, such access poses a threat to any program running in that memory. A software-only attack using a common peripheral device that can be propagated through the Internet is probably the greatest threat to a pay-per-use computer business model.

To help blunt such an attack, the policy 208 may specify pre-approved peripherals that are allowed to operate with DMA access. One method of allowing those pre-approved peripherals, for example, peripheral 222, and disabling others, for example, peripheral 224, is to only set virtual address translations in the I/O TLB 226 for the pre-approved peripherals. Setting the interrupt manager 228 to ignore I/O TLB misses for non-approved peripherals or to return non-functional addresses further strengthens the effectiveness of denying peripherals DMA access.

In another embodiment, address mappings for non-approved peripherals may point to a monitored address such that attempted access by the non-approved peripheral can trigger a security alert or be referred to the policy manager for processing. When persistent or suspicious activity occurs in non-approved peripherals, the policy manager may further restrict operation of the computer 110, log the activity, send a message to a server (not depicted) cataloging the behavior for trend analysis or a combination of these.

Figure 3:
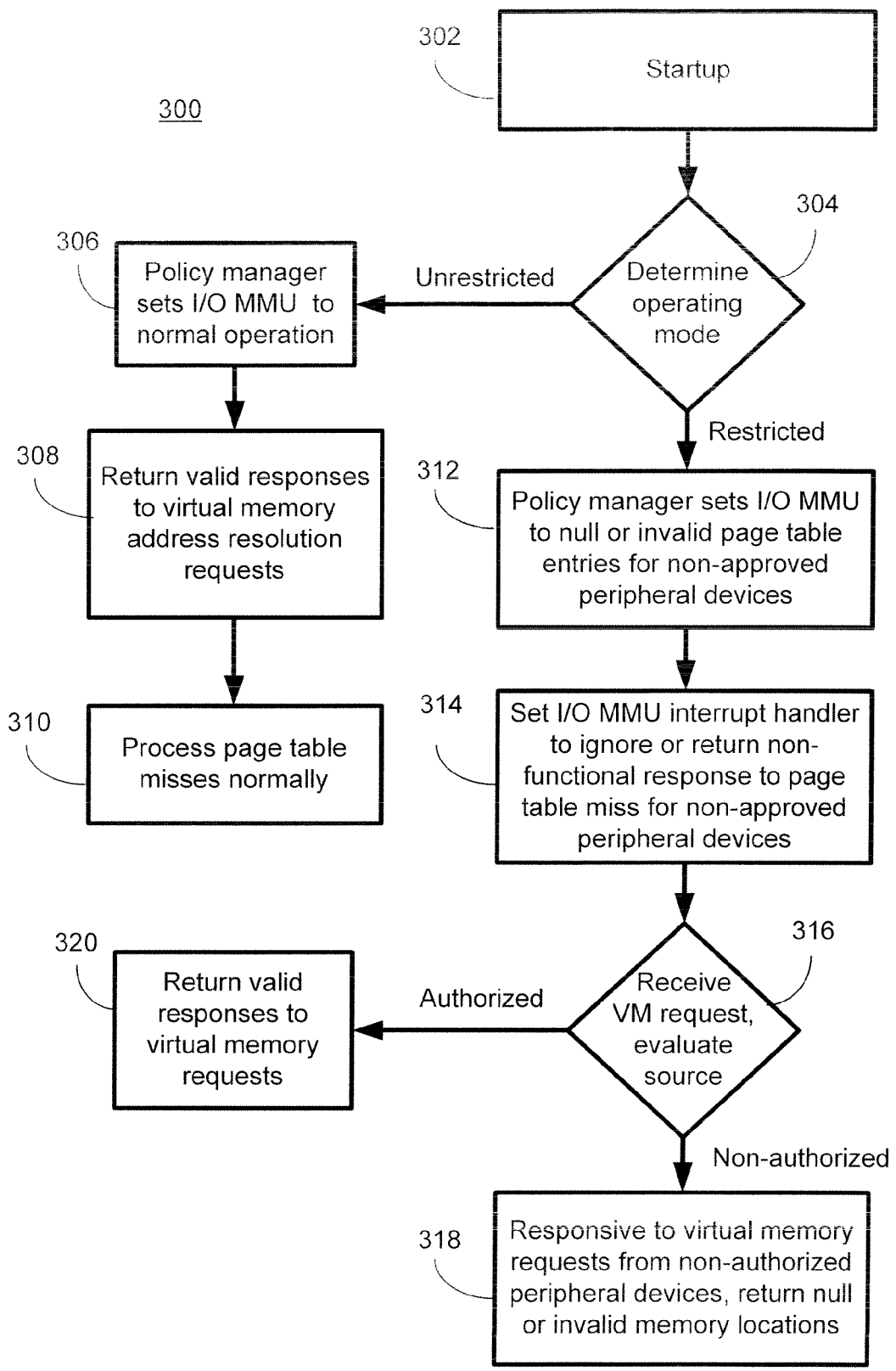
FIG. 3 is a flow chart of an exemplary method of executing policy-based direct memory access control.

FIG. 3 is a method 300 of executing policy-based direct memory access control. At block 302 the computer 200 may startup. At block 304, a determination of operating mode may be made. A register may be set prior to the current boot or an early boot operation may determine if contractual terms required for normal operation are satisfied. A method of determining and enforcing boot cycle operating mode selection and compliance is described in U.S. patent application Ser. No. 11/668,442 filed Jan. 29, 2007. When contractual terms are satisfied, the 'unrestricted' branch from block 304 may be followed. At block 306 a software policy manager executing policy 208 may set I/O MMU 210 to normal operation by loading virtual address page tables for all known peripheral devices. High frequency address translations may be loaded into the I/O TLB 226. At block 308, responsive to an address resolution request for DMA access from a peripheral device, a valid address may be returned.

At block 310, when a I/O TLB miss occurs, the interrupt manager 228 may cause either the processor 212 or the I/O MMU 210 to search the virtual address page tables until a match is found and loaded into the I/O TLB 226. At this point, a retry of the virtual address request may be made and the correct address resolution performed.

When, at block 304, a determination may be made that the operation is in the restricted mode, the 'restricted' branch from block 304 may be taken to block 312. At block 312, the software policy manager executing policy 208 may set the I/O MMU 210 to restricted operation to bar non-authorized peripheral devices from direct memory access to main memory 206. At block 312, the policy manager may remove or set to non-existent locations the I/O MMU 210 page table values for non-authorized peripherals.

At block 314, the I/O MMU interrupt manager 228 may be set ignore I/O TLB 226 misses for address requests from non-authorized peripheral devices. Alternatively, the interrupt manager 228 may return a null or invalid value for I/O TLB misses. At block 316, when a virtual memory request is received from a peripheral device, a determination may be made at the software policy manager it accordance with policy 208 whether the peripheral device is allowed direct memory access. If so, the 'authorized' branch from block 316 may be followed to block 320. At block 320, valid responses to virtual memory address resolution requests may be returned.

However, at block 316, when a determination is made that the peripheral device requesting DMA access is not an approved device, the 'non-authorized' branch from block 316 may be followed to block 318. At block 318, a null response or an invalid response may be set for the peripheral devices request for DMA access.

In cases where the I/O MMU 210 actually resolves the memory access request and performs the direct memory read or write on behalf of the requesting peripheral device, a response to the requesting device may not be made. Because the I/O MMU 210 cannot resolve a valid address, the operation will simply fail and the attempt by the peripheral device for DMA access will not be performed.

The use of an I/O MMU to ignore or misdirect DMA memory access requests based on an operating state of the computer and a corresponding peripheral device policy gives system programmers a new tool for management of a limited mode operating state. This is especially useful for self-administered devices such as a pay-per-use computer or other electronic device. The ability to set and manage multiple modes of operation allows users to freely customize a pay-per-use computer with additional peripherals and capabilities to suit their needs. However, by authorizing only known, approved peripherals to continue DMA access during certain modes, such as a restricted mode operation, the attack profile of the computer can be greatly reduced, giving an additional measure of confidence to system underwriters who take on the financial risk associated with subsidized computer distribution.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. An electronic device supporting direct memory access (DMA) arranged and adapted for use in an unrestricted mode of operation and a restricted mode of operation comprising:
   a processor;
   a memory controller coupled to the processor;
   a main memory coupled to the memory controller;
   an input/output (I/O) controller incorporating a peripheral device direct memory access controller coupled to one of the processor and the memory controller;
   a plurality of peripheral devices each coupled the I/O controller and having direct memory access when operation is in the unrestricted mode; and
   a policy manager software executable that evaluates subscription status related to pay-per-use operation operable to hinder functionality of each of the plurality of peripheral devices when operation of the electronic device is in the restricted mode because subscription terms are not met, functionality hindered by limiting each of the peripheral device's direct memory access.

2. The electronic device of claim 1, wherein operation in the restricted mode is evaluated during a boot cycle of the computer.

3. The electronic device of claim 1, wherein the policy manager is a software executable run on a virtual machine manager running on the processor.

4. The electronic device of claim 1, wherein the policy manager determines when a second peripheral device is authorized for use in the restricted mode and allows direct memory access when operation of the electronic device is in the restricted mode.

5. The electronic device of claim 1, wherein the I/O controller comprises a memory manager that correlates a virtual memory address from the peripheral device to a physical address in the main memory wherein the I/O controller maps the virtual address from the peripheral device to a non-existent physical address when operation in the restricted mode.

6. The electronic device of claim 5, further comprising an interrupt manager that returns physical address mappings to the memory manager when operation is in the unrestricted mode and returns the non-existent physical address when operation is in the restricted operation mode.

7. The electronic device of claim 5, further comprising an interrupt manager that returns physical address mappings to the memory manager when operation is in the unrestricted mode and returns no result when operation is in the restricted operation mode.

8. A method of limiting operation of a computer peripheral device comprising:
   determining when the computer is in a limited operation mode;
   setting an invalid page table entry for the computer peripheral device direct memory access (DMA) when the computer is in the limited operation mode;
   receiving an address resolution request for direct memory access from the computer peripheral device;
   determining if the computer peripheral device is not authorized for DMA when in the limited operation mode; and
   returning the invalid page table entry responsive to the address resolution request when the computer peripheral device is not authorized for DMA and the computer is in the limited operation mode.

9. The method of claim 8, wherein returning the invalid page table entry comprises returning an address for an invalid physical memory address.

10. The method of claim 8, wherein returning the invalid page table entry comprises returning a null response to the address resolution request.

11. The method of claim 8, wherein returning the invalid page table entry comprises returning an address to a location that triggers a security alert.

12. The method of claim 11, further comprising returning the valid page table entry responsive to a receiving a request for address resolution when the computer is in the full operation mode.

13. The method of claim 8, further comprising returning a valid page table response when the computer is in the limited operation mode for a second computer peripheral device that is authorized for use when the computer is in the limited operation mode.

14. The method of claim 8, wherein determining when the computer is in the limited operation mode comprises determining at a policy manager when the computer is in the limited operation mode and the policy manager sets invalid page table values for the computer peripheral device DMA when the computer is in the limited function mode.

15. The method of claim 14, further comprising setting an interrupt handler to ignore page table fault interrupts for the computer peripheral device when the computer is in a limited operation mode.

* * * * *